United States Patent [19]

Sodos

[11] Patent Number: 5,239,651

[45] Date of Patent: Aug. 24, 1993

[54] METHOD OF AND APPARATUS FOR ARBITRATION BASED ON THE AVAILABILITY OF RESOURCES

[75] Inventor: Martin Sodos, San Jose, Calif.

[73] Assignee: Sun Microsystems, Inc., Mountain View, Calif.

[21] Appl. No.: 815,499

[22] Filed: Dec. 30, 1991

[51] Int. Cl.⁵ .............................................. G06F 13/14
[52] U.S. Cl. .................................... 395/725; 395/250; 395/325; 364/242.92; 364/242.31; 364/239; 364/239.8; 364/242.3; 364/239.6; 364/DIG. 1; 364/939; 364/939.7; 364/937.01; 364/DIG. 2
[58] Field of Search ............... 395/725, 325, 275, 250, 395/425; 364/242.92, 242.31, 239, 239.8, 239.6, 242.3, DIG. 1, 939, 939.7, 937.01, DIG. 2

[56] References Cited

U.S. PATENT DOCUMENTS

| | | | |
|---|---|---|---|
| 4,648,029 | 3/1987 | Cooper et al. | 395/325 |
| 4,716,523 | 12/1987 | Burrus, Jr. et al. | 395/425 |
| 4,716,525 | 12/1987 | Gilanyi et al. | 395/250 |
| 4,942,553 | 7/1990 | Dalrymple et al. | 395/250 |
| 4,987,529 | 1/1991 | Craft et al. | 395/325 |
| 5,072,420 | 10/1991 | Conley et al. | 395/425 |
| 5,079,693 | 1/1992 | Miller | 395/250 |
| 5,083,260 | 1/1992 | Tsuchiya | 395/325 |
| 5,111,425 | 5/1992 | Takeuchi et al. | 395/425 |
| 5,155,810 | 10/1992 | McNamara, Jr. et al. | 395/250 |

*Primary Examiner*—Michael R. Fleming
*Assistant Examiner*—Glenn A. Auve
*Attorney, Agent, or Firm*—Blakely Sokoloff Taylor & Zafman

[57] ABSTRACT

A method and apparatus for arbitrating among multiple requested data transfers based on the availability of transfer resources. A request for the control of a resource is transmitted to an arbiter with information regarding the size of data transfer, internal buses and external buses required. The arbiter compares the information with the space remaining in the buffer, internal bus availability and external bus availability. If all the resources are available to complete the request, then the request is granted arbitration and the requested transfer is started. If any of the resources is not available, the arbiter takes the next request for evaluation. A mechanism is also provided for each request to require the arbiter to wait until all the resources are available to prevent the arbiter from taking on the next request.

11 Claims, 3 Drawing Sheets

METHOD OF AND APPARATUS FOR ARBITRATION BASED ON THE AVAILABILITY OF RESOURCES

BACKGROUND OF THE INVENTION

1. Field of the Invention

The present invention is related to data transfer operations in a computer system and more specifically, to arbitration of transfer resources for data transfer operations in a computer system.

2. Art Background

In a computer system, a transfer resource such as a bus or a buffer can be shared pathway bridging between two or more devices. Although data in a resource may be available to all attached devices, only one device should be allowed to transmit data into the resource in order to have a valid transmission. Because more than one device may need control of the resource at a given time, a systematic and efficient methodology of resolving contentions among multiple requesting devices plays a crucial role in the success of the computer system.

Modern computer systems commonly have arbitration schemes with either fixed or rotating priority-based controllers, i.e. arbiters, to resolve resource contentions. In a fixed priority system, each requesting device is given a rank in a hierarchy: when two or more devices are active, the highest ranked device is granted first, and others will follow in sequence of decreasing rank. Although contentions are resolved, the rigidity of a fixed priority scheme often leads to the problem of starvation: the low priority requesters may be excluded from using the resource if high priority devices alternate with their control of the resource. Also, from a system utilization perspective, if a high priority device's operation is suspended because resources down the transfer pathway are unavailable, the low priority devices should be allowed to use the resource to prevent system idling. In this respect, the fixed priority system fails to provide for such an occurrence.

In a rotating priority system, the control of a resource is routed through all possible requesters by issuing a token in either a round robin or random order. A requester can only gain control of the resource when the token is received. Although each device is given an access right to the resource, a system can still be forced to idle when device A cannot complete its operation due to unavailability down the pathway, and the next-in-line device B does not get the token. As in the fixed priority scheme, the rotating priority system cannot provide efficient resource utilization and high operation band-width.

The shortcomings in the fixed and rotating priority systems are exacerbated when a resource is simultaneously handling multiple-channel data transfers, as in the case of direct memory access ("DMA") operations. DMA is an efficient technique for transferring large volumes of data among devices and memory in that the central processing unit ("CPU") can be freed up from the straightforward transfer operation. To transfer data, a DMA controller must gain control of the bus or buses. When there are multiple channels of transfer requested by various devices attached to the DMA controller, the latter should be able to service the channels in a time-multiplexing fashion to achieve system efficiency. In other words, one device should not hold up one or more resources while waiting for the remaining resources to become available. In that sense, a DMA controller itself can be viewed as a resource to be shared among the requesting devices and such sharing must be efficient and fair. A DMA transfer operation easily requires multiple resources such as buses and buffers to complete. However, with a fixed or rotating priority system, the DMA controller must observe the rigid priority scheme even though the other necessary resources are not available for a requester to complete the operation. There is no mechanism for the controller to skip to the next requester capable of completing the transfer while the first requester is waiting for its resources to become available.

As will be described in the following, the present invention discloses a method and apparatus for arbitrating among a plurality of requesting devices based on the availability of transfer resources with respect to completing the requested transfer. As will be apparent from the following description, the present invention provides an intelligent arbitration based on an evaluation of the transfer resources with respect to the requested operation so that the system can achieve efficient utilization.

SUMMARY OF THE INVENTION

Therefore, it is an object of the present invention to resolve resource contentions among multiple data transfer operations.

It is also an object of the present invention to achieve efficient resource utilization for a resource handling multiple time-multiplexing data transfer operations.

It is another object of the present invention to allow the arbiter to wait on the requested resources until they are available for the requested operation.

The present invention discloses a method and apparatus for arbitrating among multiple requested data transfers based on the availability of transfer resources. A request for the control of a resource is transmitted to an arbiter with information regarding the size of data transfer, internal buses and external buses required. The arbiter compares the information with the space remaining in the buffer, internal bus availability and external bus availability. If all the resources are available to complete the request, then the request is accepted and the requested transfer is started. If any one of the resources is not available, the arbiter takes the next request for evaluation. A mechanism is also provided for each request to require the arbiter to wait until all the resources are available to prevent the arbiter from taking on the next request.

BRIEF DESCRIPTION OF THE DRAWINGS

Further objects, features and advantages of the present invention will become apparent in the following description, wherein.

Notation And Nomenclature

Figure 1:
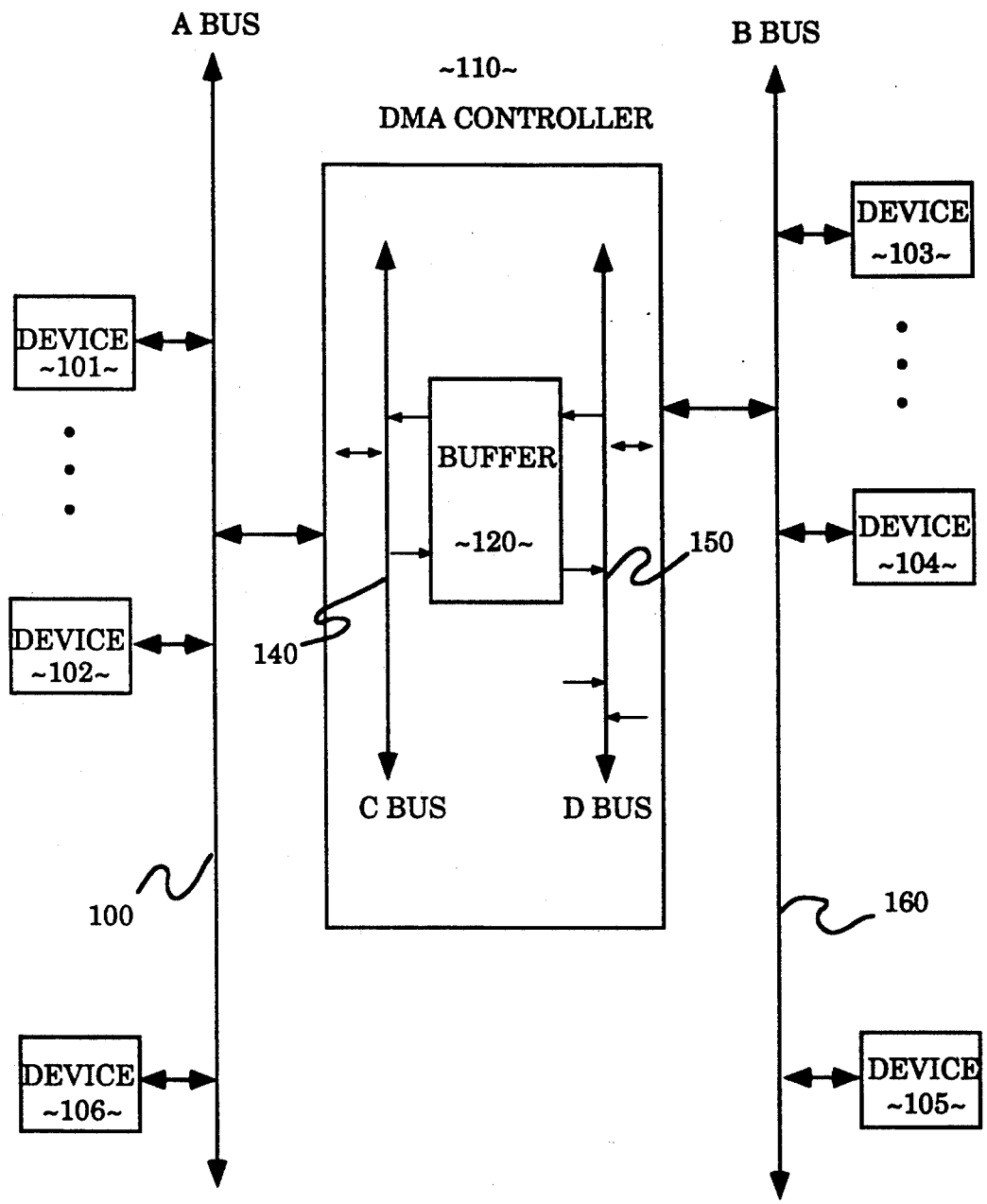
FIG. 1 is a diagram illustrating various transfer resources for data transfer operations.

The detailed descriptions which follow are present largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

Coding Details

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

A method and apparatus for arbitrating among multiple data transfer operations based on the availability of transfer resources is disclosed. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

Referring to FIG. 1, a diagram illustrating the various transfer resources for data transfer operations is shown. Although the following description is made in reference to multiple-channel DMA operations, it should be appreciated by those skilled in the art that other transfer operations may easily incorporate the teachings of the present invention for the purpose of achieving system efficiency. For example, in a system with multiple resources needed to implement one or more requests, the present invention will provide an efficient allocation of the resources. With reference now made to FIG. 1, DMA controller 110 is shown bridging between ABus 100 and BBus 160, where devices 101-105 are connected. Within the structure of DMA controller 110, buffer 120 is implemented between cBus 140 and dBus 150. When a request is granted by an arbiter (not shown) to transfer data from device 101 to device 103 under a fixed or rotating priority scheme, a host of resources will be required to complete the requested transfer, namely ABus 100, cBus 140, buffer 120, dBus 150 and BBus 160. However, if a resource, e.g. BBus 160, happens to be in use by device 105 for transferring data to device 104, the request by device 101 will not be able to complete even though it has be granted by the rigid priority system. Worse yet, the request by device 101 maintains control of the transfer resources, preventing other requests from gaining control of any of the resources. As described, the present invention resolves the problem by evaluating all the resources required by each request before granting the operation. As such, the waste-of-resource problem is significantly reduced and the system is better utilized.

Figure 2:
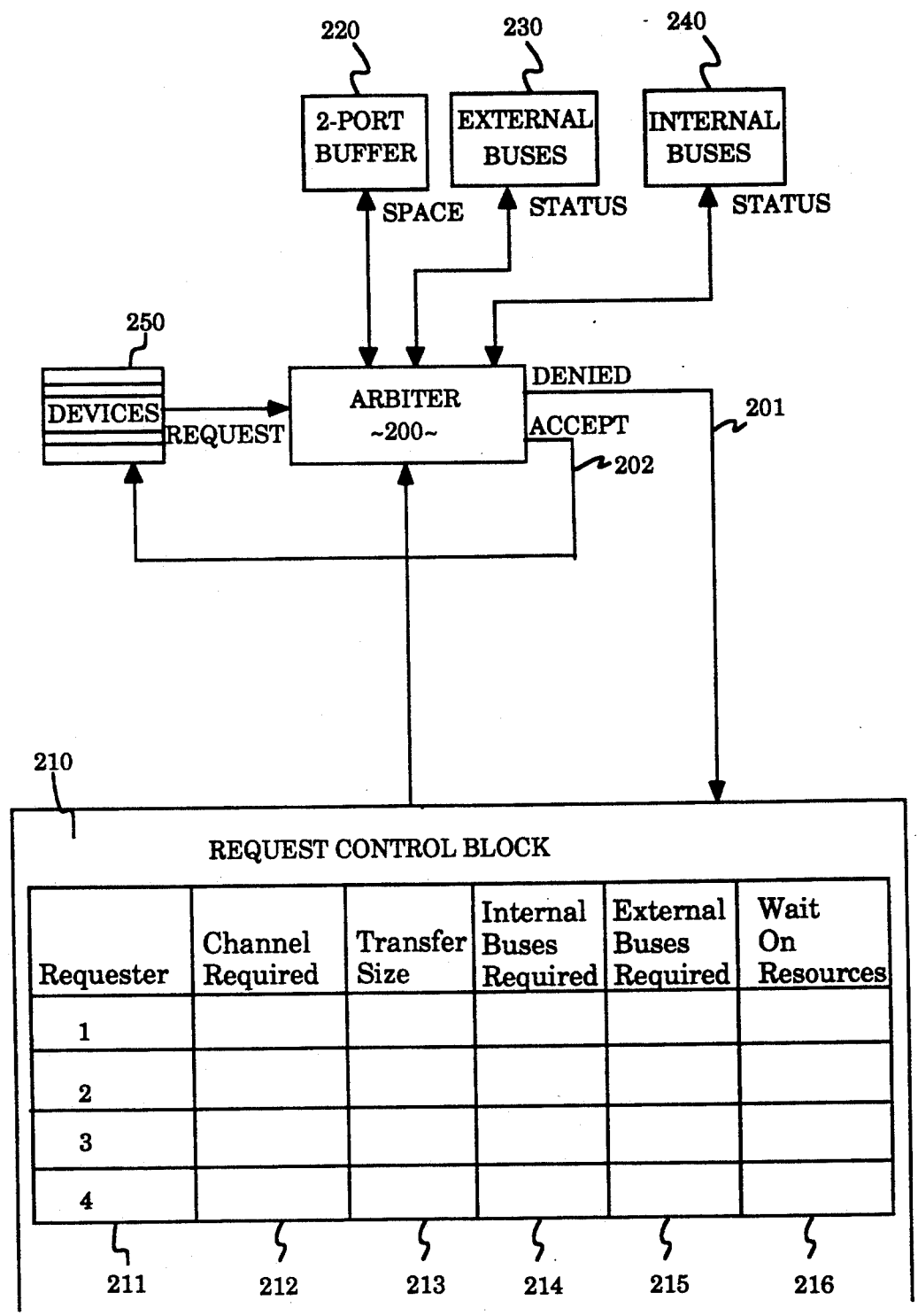
FIG. 2 is a block diagram showing a system of resources to be allocated according to the present invention.

Reference is now made to FIG. 2, where a block diagram showing a system of resources to be allocated according to the present invention is illustrated. Arbiter 200 is shown connected to arbitrate among the requests transmitted from any one of the devices 250. Also connected to arbiter 200 are the "space_remaining" line of two-port buffer 220 and "status" lines of external buses 230, and internal buses 240, which indicate whether the buses are available. Requests from devices 250 are also represented in request control block 210 as an array comprising information regarding requester identification 211, channels 212, transfer_data_sizes 213, internal buses 214, external buses 215 and wait_on_resources command 216. Each request is associated with information regarding what DMA channel the transfer is to occur, the total count of transfer, which buses are needed to complete the transfer, and whether a wait command is asserted so that the request will not be denied before its resources are available. Note that different channels are presented so that data transfer can be accomplished through more than one channel as specified by each request in its respective DMA operation.

In operation, when arbiter 200 receives a request from one of the devices 250, the information in request control block 210 associated with that request is made available to arbiter 200. Arbiter 200 evaluates the request by comparing the information from request control block 210 with the space_remaining line from two-port buffer 220 and status lines from external buses 230 and internal buses 240. Specifically, the space_remaining line from two-port buffer 220 is compared with transfer size 213 of the request to determine whether two-port buffer 220 can accommodate the transfer request. It should be appreciated by those skilled in the art that for a two-port buffer, the space_remaining line is a value representing the difference between data written in and data read out. The status lines from internal and external buses 230, 240 are continuous signals which are asserted only when buses are in use and de-asserted when not in use. When all the conditions are met, i.e. the space is available and the buses are not in use, an ACCEPT signal 202 is returned to the requesting device to start the transfer operation. If any condition is not met, i.e. one of the resources is not available, then arbiter 200 returns a DENY signal 201 to the requesting device and proceeds to receive the next request from one of the devices 250. Similarly, the next request will index the same kind of information in request control block 210 for arbiter 210 to compare. As an additional feature, if wait_on_resources 216 associated with the first request is enabled, arbiter 200 will not proceed to the next request, but will keep evaluating until all the resources are available.

Therefore, a request for transfer resources is evaluated by an arbiter to determine the availability of all transfer resources before the requested operation can proceed. Also, because the status lines and space_remaining lines are indicated by continuous signals from the resources, the evaluation can take place in one cycle for at least one request since requests may be reviewed in-parallel, rather than in-series.

Figure 3:
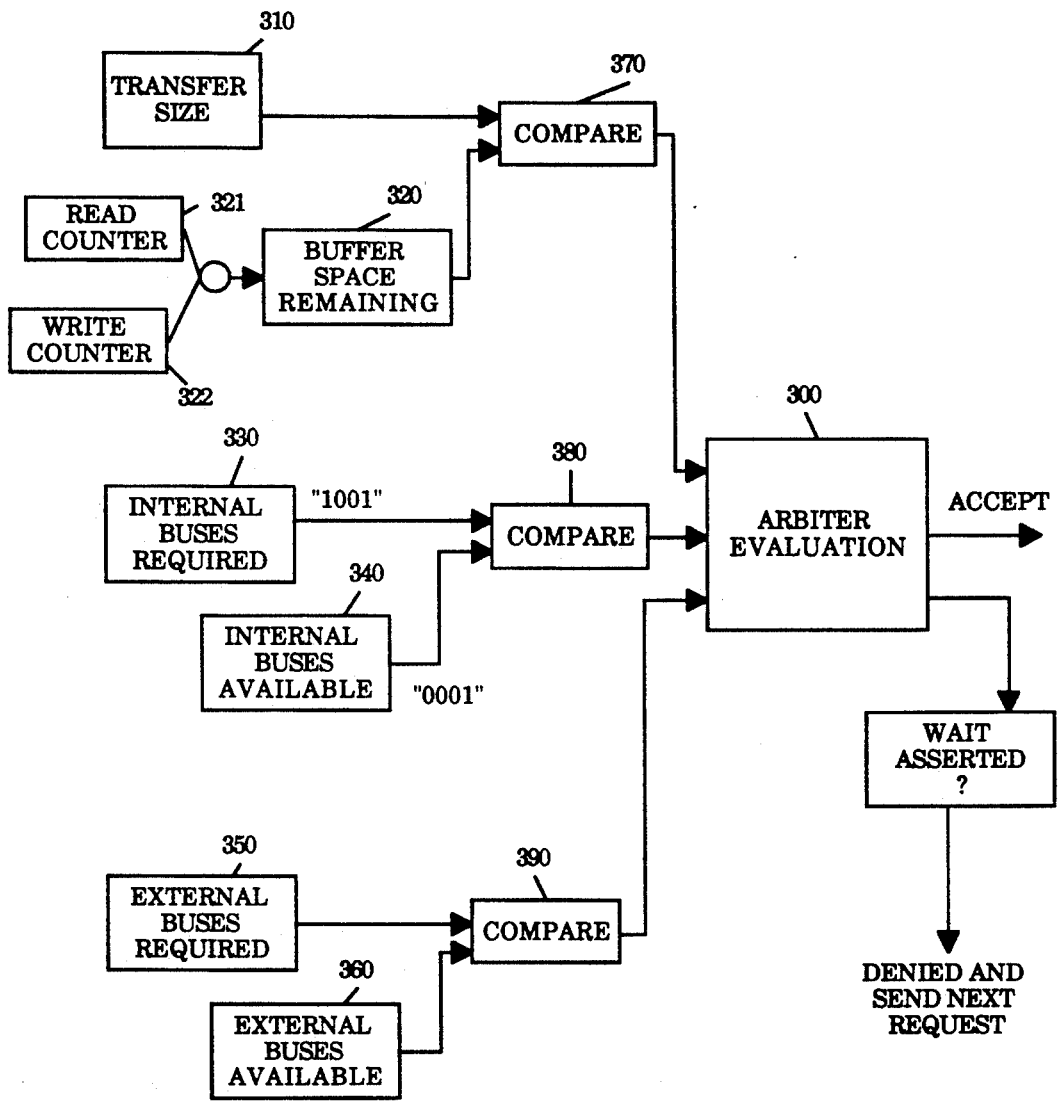
FIG. 3 is a block diagram showing the evaluation of requests.

Reference is now made to FIG. 3, where a block diagram showing the evaluation of requests is illustrated. In response to a request from a device, the arbiter compares transfer size 310 with buffer space_remaining 320, internal_buses_required 330 with internal_buses_available 340, and external_buses_required 350 and external_buses_available 360. Note that buffer space_remaining 320 represents the difference between read counter 321 and write counter 322 of the buffer, which maintains the data read count and data write count, respectively. The signal from internal_buses_required 330 can be an n-digit binary value with "n" being the number of internal buses. Each asserted digit can be made to represent a bus required, e.g. a value of "1001" representing buses No. 1 (MSB) and No. 4 (LSB) are required out of four existing buses. Similarly, the value from internal_buses_available can be an n-digit number with each bit representing the availability of the bus. Thus, as shown in FIG. 3, a value of "0001" indicates the status that bus No. 4 (LSB) is available. The values from internal_buses_required 330 and internal_buses_available 340 are compared 380 to determine whether the required buses are available.

A similar comparing process 390 is conducted between external_buses_required 350 and external_buses_available 360. The results of compare 370, 380, 390 is true if buffer space_remaining can accommodate the transfer size, internal buses are available as required, and external buses are available as required. When all the resources are available, i.e. when all the outputs of compare 370, 380, and 390 are true, the result of arbiter evaluation 300 returns either an ACCEPT signal, or a DENY signal, which triggers the next request to be evaluated. If an ACCEPT signal is issued, the requested operation is started.

Furthermore, in the preferred implementation, a wait_on_resources command is included to be specified by a request such that even if not all resources are available for transfer, the arbiter will wait on further arbitration until they are available at which time the request is performed. This wait command thus allows a device to bypass the resource-available arbitration to effectively fall back to a fixed priority scheme.

Although the present invention has been described in connection with two-port buffers, internal buses and external buses, it will be appreciated by those skilled in the art that other resources can readily be included for evaluating the requests from various devices. Also, it should be appreciated by those skilled in the art that status lines from the resources are continuously generated such that the arbiter can evaluate the information during the same clock cycle as the information regarding the requested resources is received.

With reference back to FIG. 1, it should be noted that in the preferred embodiment, a two-port buffer 120 is implemented with the ability to handle multiple-transfers. Thus, the buffer can transfer data out while reading data in, although not necessarily at the same date rate. It should be apparent that no evaluation of buffer capacity is necessitated if the buffer is of the type that can handle single transfers, e.g., one that must be emptied before filling again. In that case, buffer is exclusively used by one channel and no sharing can be performed. Also, more efficient transfers can be made through the buffer when each requested transfer can be split into disjointed sequences of data such that the buffer is utilized more towards its capacity with the sequences, assuming no contention problems regarding the resources occur.

I claim:

1. In a computer system with DMA operations, a method of arbitrating among a plurality of requests for using a two-port buffer and a data bus to complete a DMA operation, said two-port buffer having read and write counts, said data bus having a status line to indicate whether said data bus is in use, said method comprising:

receiving a first request, said first request identifying a transfer size required, said two-port buffer and said data bus necessary to complete an operation by said two-port buffer;

comparing said transfer size with a space remaining count for said two-port buffer to determine whether said two-port buffer can accommodate said transfer size;

reading the status line of said data bus to determine whether said data bus is available;

evaluating whether said transfer size can be accommodated by said two-port buffer and whether said data bus is available;

granting arbitration to said request for use of said two-port buffer if said transfer size can be accommodated by said two-port buffer and said data bus is available;

receiving a second request, if the transfer size cannot be accommodated or said data bus required is not available;

whereby arbitration is granted to a request for use of said two-port buffer only when those resources specified in the request are available.

2. A method according to claim 1, wherein said first request also contains a wait command, said method further comprising the step of:

if said wait command is set by said first request, waiting until said first request is granted arbitration.

3. A method according to claim 2, wherein said transfer size further comprises a plurality of data slices for said operation, each of said data slices being a time-divided portion of a total transfer sequence for said operation such that said two-port buffer determines whether said two-port buffer has space available to accommodate at least one slice for a DMA channel.

4. A method according to claim 3, wherein said status line is a two-state continuous signal, a first state representing that the data bus is available and a second state representing that the data bus is unavailable.

5. A method according to claim 1, wherein said space remaining count for said two-port buffer is the difference between the write and read counts for said two-port buffer.

6. In a computer system with DMA operations, an apparatus for arbitrating among a plurality of requests for using a two-port buffer and a data bus to complete a DMA operation, said two-port buffer having read and write counts, said data bus having a status line to indicate whether said data bus is in use, said apparatus comprising:

receive means for receiving a first request, said first request identifying a transfer size required for said two-port buffer and said data bus necessary to complete an operation by said two-port buffer;

first compare means coupled to said receive means for comparing said transfer size with a space remaining count for said two-port buffer to determine whether said two-port buffer can accommodate said transfer size;

second compare means coupled to said receive means for reading the status line of said data bus to determine whether said data bus is available;

evaluate means coupled to said first and second compare means for evaluating whether said transfer size can be accommodated by said two-port buffer and whether said data bus is available, said evaluate means accepting said request if said transfer size can be accommodated by said two-port buffer and said data bus is available;

grant means coupled to said evaluate means for granting arbitration to said first request for use of said two-port buffer, said receive means receiving a second request if the transfer size cannot be accommodated or said data bus required is not available for said first request.

7. An apparatus according to claim 6, further comprising a wait detect means coupled to said receive means such that if a wait command is set by said first request a second request is not received until said first request is granted arbitration.

8. An apparatus according to claim 7, wherein the status line for each of the data bus is a two-state continuous signal, one of the two states representing that the data bus is available and the other state representing the data bus is not available.

9. An apparatus according to claim 6, wherein said transfer size further comprises a plurality of data slices for said operation, each of said data slices being a time-divided portion of a total transfer sequence for said operation such that said two-port buffer compares whether said two port buffer has space available to accommodate at least one slice for a DMA channel.

10. An apparatus according to claim 6, wherein said receive means receives a plurality of requests in parallel to arbitrate.

11. An apparatus according to claim 6, wherein said space remaining count for said two-port buffer is the difference between the write and read counts for said two-port buffer.

* * * * *